US008471961B2

(12) United States Patent
Uemura et al.

(10) Patent No.: US 8,471,961 B2
(45) Date of Patent: Jun. 25, 2013

(54) VIDEO PROCESSING APPARATUS AND VIDEO PROCESSING METHOD

(75) Inventors: Shinichi Uemura, Kawasaki (JP); Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 12/970,076

(22) Filed: Dec. 16, 2010

(65) Prior Publication Data

US 2011/0170009 A1 Jul. 14, 2011

(30) Foreign Application Priority Data

Jan. 8, 2010 (JP) ................................. 2010-003412

(51) Int. Cl.
*H04N 5/00* (2006.01)
*H04N 9/76* (2006.01)
*H04N 7/12* (2006.01)
*H04N 11/02* (2006.01)
*H04N 11/04* (2006.01)
*G09G 5/36* (2006.01)

(52) U.S. Cl.
USPC ....... 348/607; 348/598; 345/547; 375/240.01

(58) Field of Classification Search
None
See application file for complete search history.

(56) References Cited

U.S. PATENT DOCUMENTS

2008/0063048 A1 3/2008 Ouchi et al.
2009/0309890 A1 12/2009 Mizuno et al.
2011/0081095 A1 * 4/2011 Sakashita ...................... 382/264

FOREIGN PATENT DOCUMENTS

JP 2002-351382 12/2002
JP 2008-064919 3/2008

* cited by examiner

*Primary Examiner* — Jefferey Harold
*Assistant Examiner* — Sean Haiem
(74) *Attorney, Agent, or Firm* — Fitzpatrick, Cella, Harper & Scinto

(57) ABSTRACT

A video processing apparatus prevents image quality degradation, while reducing motion by combining high-frequency and low-frequency image data at the immediately preceding sub-frame at a first composite ratio α, generating first-sub-frame image data. By combining low-frequency image data and high-frequency image data at a second composite ratio 1-α, image data is generated as second-sub-frame image data. Then, the second-sub-frame image data is output with their polarity inverted with respect to the first-sub-frame image data. The ratio α is gradually decreased frame by frame at a first frame group, and the ratio α is gradually increased frame by frame at a second frame group subsequent to the first frame group.

6 Claims, 7 Drawing Sheets

VIDEO PROCESSING APPARATUS AND VIDEO PROCESSING METHOD

BACKGROUND OF THE INVENTION

1. Field of the Invention

The present invention relates to a video processing technique, and more specifically to a technique for effectively preventing image quality degradation, such as burn-in, in a liquid crystal display device.

2. Description of the Related Art

Liquid crystal display devices (such as direct-view-type liquid crystal display devices, and liquid crystal projectors) employ a method to adjust the amount of light constantly emitted from a light source by using a liquid crystal shutter, and are, therefore, referred to as hold-type display devices. Hold-type display devices emit light on a one-frame-period basis; therefore, by conducting visual following (viewing an image performed by following moving portions of an image with the eyes in moving image display), "motion blur" corresponding to light emission periods is observed. As a method for solving this problem, a pseudo-impulse driving method is used, for example. In the pseudo-impulse driving method, sub-frames are generated by multiplying a frame frequency N-fold. Thereafter, spatial high-frequency components greatly contributing to "motion blur" are concentrated on one of the sub-frames and thus a high-frequency enhance image is displayed; on the other hand, in other sub-frames, a low-frequency image is displayed in which spatial low-frequency components are distributed, (see Japanese Patent Laid-Open No. 2002-351382, for example).

In general, when a direct voltage has been applied between the pixel electrode and the counter electrode of liquid crystal display devices for hours, an imbalance in the ion density is created inside, and thus their tone characteristics cannot be reproduced, that is, so-called "burn-in" occurs. Because of this, to prevent the creation of the imbalance in the ion density in the liquid crystal display device, driving is performed in which the polarity of a video signal voltage applied to the liquid crystal sub-frame by sub-frame is periodically inverted relative to a common electrode voltage (VCOM).

As a result, the problem has arisen that since there is a difference in the applied voltage between sub-frames in such pseudo-impulse driving, an imbalance in the polarity of the applied voltage occurs, and thus burn-in occurs during their long-time use. As a method to solve such a problem, Japanese Patent Laid-Open No. 2008-064919 discloses a technique of preventing an imbalance in the polarity of applied voltages by extending a polarity inversion driving period from a sub-frame-by-sub-frame basis to a frame-by-frame basis.

However, in the method of extending the polarity inversion period disclosed in Japanese Patent Laid-Open No. 2008-064919, there is a problem that since the polarity inversion period increases, flicker tends to occur.

SUMMARY OF THE INVENTION

The present invention provides a method for implementing pseudo-impulse driving while preventing image quality degradation, such as burn-in, without changing the polarity inversion period.

According to one aspect of the present invention, a video processing apparatus is provided which inputs a video signal input on a frame-by-frame basis, generates two sub-frame images at each frame, and outputs the generated images. The apparatus includes an input unit configured to input a video signal on a frame-by-frame basis, a sub-frame generating unit configured to generate high-frequency image data and low-frequency image data from original image data input at each frame and to alternately output the generated high-frequency image data and low-frequency image data at a frequency that is double the frame rate at which the input unit has input the video signals, a storage unit configured to store the high-frequency and low-frequency image data output from the sub-frame image generating unit, an image combining unit configured to generate image data as first-sub-frame image data by combining the high-frequency image data output from the sub-frame image generating unit and low-frequency image data at the immediately preceding sub-frame read from the storage unit at a first composite ratio $\alpha$ ($0 \leqq \alpha \leqq 1$) and to generate image data as second-sub-frame image data by combining the low-frequency and high-frequency image data output from the sub-frame image generating unit at a second composite ratio $1-\alpha$, and a polarity inverting unit configured to invert the polarity of the images at the second sub-frames with respect to the images at the first sub-frames generated by the image combining unit and then output the polarity-inverted image data, wherein the image combining unit includes an adjusting unit configured to adjust the image combining unit so that the first composite ratio $\alpha$ gradually increases frame by frame while the present frame is in the first frame group composed of N consecutive frames (N is an integer of 2 or larger), and to adjust the image combining unit so that the first composite ratio $\alpha$ gradually increases frame by frame while the present frame is in the second frame group composed of N consecutive frames subsequent to the first frame group.

Further features of the present invention will become apparent from the following description of exemplary embodiments (with reference to the attached drawings).

DESCRIPTION OF THE EMBODIMENTS

Preferred embodiments of the present invention will be described in detail below with reference to the drawings.

First Embodiment

Figure 1A:
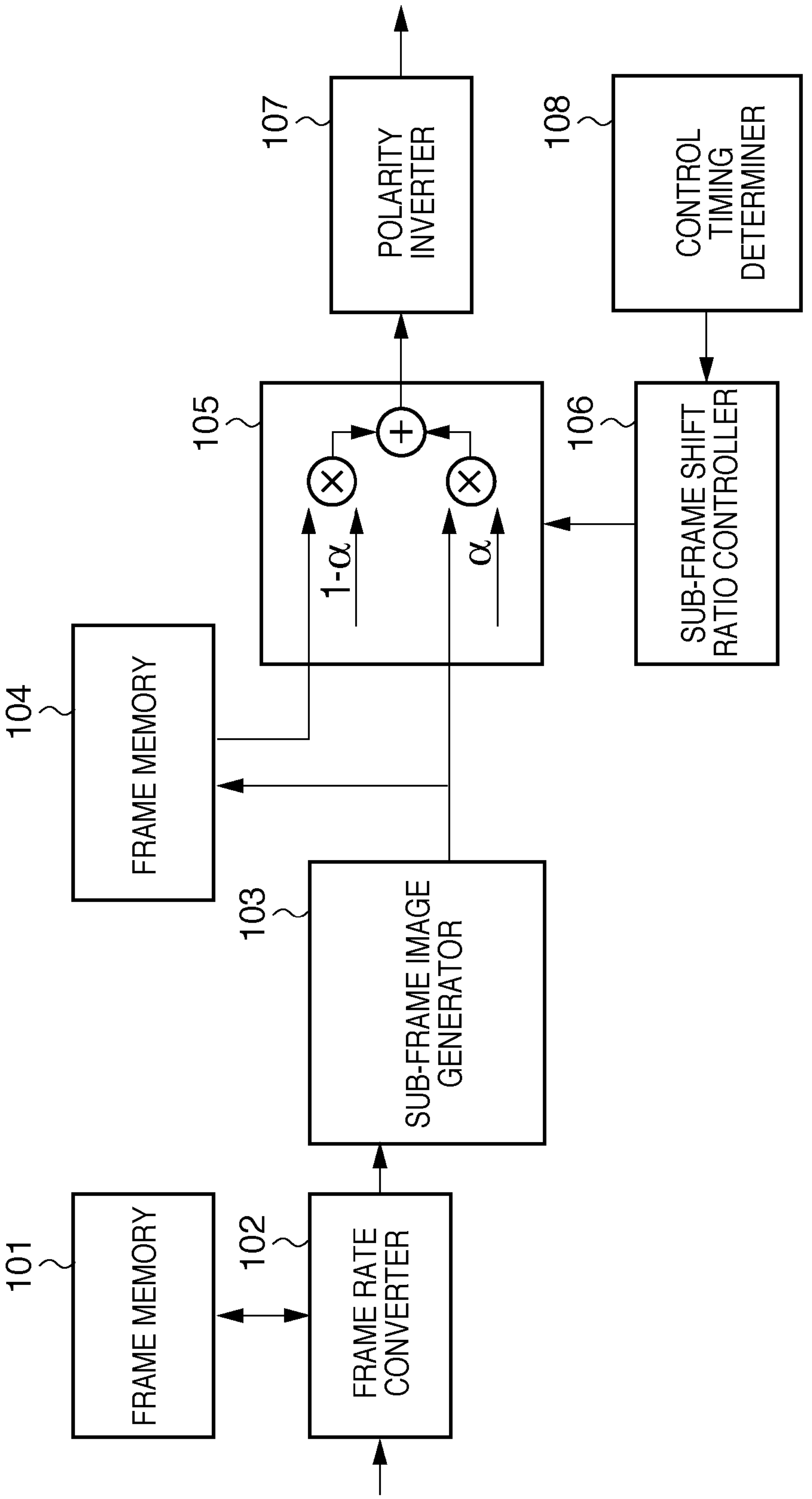
FIG. 1A is a block diagram of a video processing apparatus according to a first embodiment.

FIG. 1A is a block diagram of a video processing apparatus according to a first embodiment for operating a liquid crystal display device. To a frame rate converter 102, a video data signal with a frame rate of 60 Hz (fps), for example, is input on a frame-by-frame basis. The frame rate converter 102 stores the input one-frame original image data in a frame memory 101. Then, the frame rate converter 102 performs double-speed processing on the original image data, whereby sub-frame images are generated at double the original frame rate, i.e., at a frame rate (frame frequency) of 120 Hz. Thereafter, a sub-frame image generator 103 generates high-frequency image data (high-frequency enhanced images) and low-frequency image data from the sub-frame images. The generated high-frequency and low-frequency image data are stored in a frame memory 104.

Figure 2:
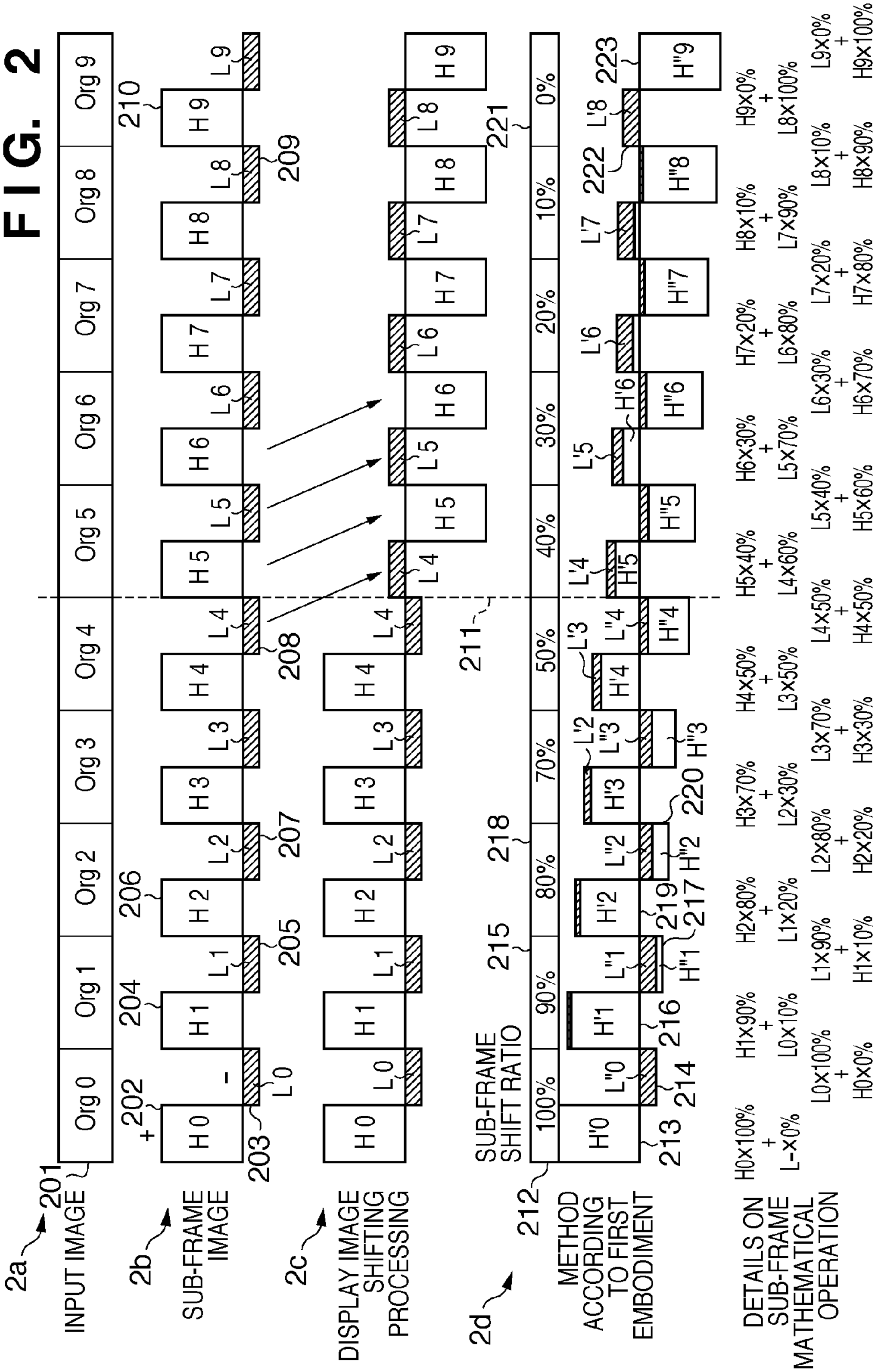
FIG. 2 is an illustration of a video processing method according to the first embodiment.

The above processing will be explained in detail below with reference to FIG. 2. In FIG. 2, it is assumed that a first frame group, which is composed of N consecutive frames (N is an integer of 2 or larger), is formed. The diagram 2*a* shows the case where N is an integer of 10, i.e., the first frame group composed of 10 consecutive frames Org(0) to Org(9). Incidentally, the figures in the parentheses denote frame numbers, and the parentheses are omitted from the figure. Reference numeral 201 denotes a 60-Hz input image Org(0) at the zeroth frame; the input image Org(0) 201 is subjected to double-speed processing. Reference numeral 202 denotes a 120-Hz high-frequency enhanced image H(0) at the zeroth frame, and reference numeral 203 denotes a 120-Hz low-frequency image L(0) at the zeroth frame. The images H(0) and L(0) are generated at the sub-frame image generator 103 of FIG. 1A after double-speed processing.

Figure 6:
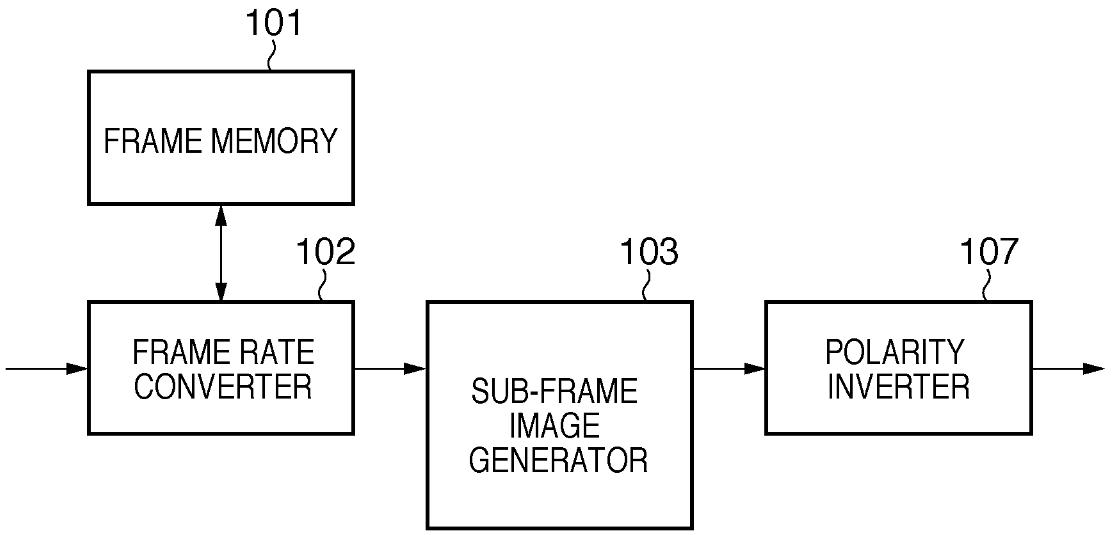
FIG. 6 is a block diagram of a related art liquid crystal impulse driving controller.

In a conventional video processing method, with a polarity inverter 107, the polarity of a voltage to be applied to a liquid crystal is inverted on a sub-frame-by-sub-frame basis with respect to sub-frame images as shown in FIG. 6; thus, as shown by the diagram 2*b* in FIG. 2, high-frequency enhanced images are displayed when applied voltages are of positive polarity, and low-frequency images are displayed when applied voltages are of negative polarity. In the case where such pseudo-impulse driving is performed for hours so that polarization of the applied voltage occurs at each sub-frame, burn-in results. The diagram 2*c* in FIG. 2 represents one solution to such a problem. Reference numeral 211 denotes image display order switching timing set at the boundary between the first half and the second half of the first frame group. As indicated by the arrows in the diagram 2*c*, a low-frequency image L(4) 208 is displayed again (inserted) at the image display order switching timing 211, and thus subsequent display images are shifted in order by one sub-frame. By performing such image display order switching, low-frequency images are displayed when applied voltages are of positive polarity, and high-frequency enhanced images are displayed when applied voltages are of negative polarity. By repeating such polarity switching, the imbalance in polarity between the applied voltages can be corrected.

There is a problem, however, that since the insertion of the low-frequency image L(4) 208 causes the subsequent display images to shift by one sub-frame, the discontinuous motion of the moving images is visually recognized. But such a problem can be circumvented by providing the image display order switching timing 211 with a predetermined timing when screen switching takes place at the time of a scene change, channel switching, or the like. In this embodiment, a method for circumventing the problem that their discontinuous motion is visually recognized will be described in detail below; in this method, instead of performing the image display order switching at the above-described predetermined timing, the image display order switching is performed during consecutive moving image display.

As shown in the diagram 2*d* in FIG. 2, the high-frequency enhanced sub-frame images H(n) and low-frequency sub-frame images L(n) (n's: frame numbers) in the diagram 2*b* are switched stepwise to individual immediately preceding sub-frame images on a frame-by-frame basis at individual sub-frame shift ratios. At the time of the switching to each immediately preceding sub-frame image, the sub-frame image delayed by one sub-frame is captured from the frame memory 104 of FIG. 1A, and then combined (merged) with the present sub-frame image at a sub-frame shift ratio by a sub-frame shift operation unit 105. Such processing is expressed by the following expression (1).

$$\text{First Sub-Frame Image}=H'(n)+L'(n)$$

$$\text{Second Sub-Frame Image}=H''(n)+L''(n)$$

$$H'(n)=H(n)*\alpha,\ L'(n)=L(n-1)*(1-\alpha)$$

$$H''(n)=H(n)*(1-\alpha),\ L''(n)=L(n)*\alpha \qquad \text{Expression (1)}$$

where $0\leqq\alpha\leqq1$ and n is a frame number.

The expression is explained as follows. To begin with, the high-frequency image data H(n) output from the sub-frame image generator 103 and the low-frequency image data at the immediately preceding sub-frame L(n−1) read from the frame memory 104 are combined at a first composite ratio α ($0\leqq\alpha\leqq1$). Image data obtained by this combination is used as first-sub-frame image data. Then, high-frequency image data H(n) and low-frequency image data L(n) output from the sub-frame image generator 103 are combined at a second composite ratio 1−α. Image data obtained by this combination is used as second-sub-frame image data. Incidentally, the first composite ratio α, which is defined as a real number from 0 to 1 in the above example, is also hereinafter referred to as "sub-frame shift ratio"; in that case, the ratio is expressed in the unit percent (%).

The above-described processing will be specifically described below with reference to the diagram 2*d* in FIG. 2. To begin with, with the zeroth frame, reference numeral 212 denotes a state where the sub-frame shift ratio is 100%, reference numeral 213 denotes the first sub-frame after a mathematical operation using the expression (1), and reference numeral 214 denotes the second sub-frame after a mathematical operation using the expression (1). At the state where the sub-frame shift ratio is 100%, the first sub-frame represents the high-frequency enhanced image H(0) 202, and the second sub-frame represents the low-frequency image L(0) 203, which is the same as in the case of ordinary pseudo-impulse driving.

Next, with the first frame, reference numeral 215 denotes a state where the sub-frame shift ratio is 90%, and reference numerals 216 and 217 respectively denote the first sub-frame and the second sub-frame after mathematical operations using the expression (1). At the state where the sub-frame shift ratio is 90%, the first sub-frame 216 represents an image generated by combining the high-frequency enhanced image H(1) 204 and the low-frequency image L(0) 203 at the ratio of 9:1, and the second sub-frame 217 represents an image generated by combining the low-frequency image L(1) 205 and the high-frequency enhanced image H(1) 204 at the ratio of 9:1.

Likewise, with the second frame, reference numeral 218 denotes a state where the sub-frame shift ratio is 80%. The first sub-frame 219 represents an image generated by combining the high-frequency enhanced image H(2) 206 and the low-frequency image L(1) 205 at the ratio of 4:1, and the second sub-frame 220 represents an image generated by combining the low-frequency image L(2) 207 and the high-frequency enhanced image H(2) 206 at the ratio of 4:1.

In this way, the ratio between the high-frequency enhanced images and the low-frequency images is changed stepwise. Finally, in a state 221 where the sub-frame shift ratio is 0%, the low-frequency image L(8) 209 is displayed at the first sub-frame 222, and the high-frequency enhanced image H(9) 210 is displayed at the second sub-frame 223, whereby the image display order switching is completed.

That is, each sub-frame image displayed as it is in the related art method (shown as the diagram 2*b* in FIG. 2) is merged with the immediately preceding sub-frame image at the sub-frame shift ratio, and the ratio is changed stepwise. By executing such processing, the image display order switching can be performed without the discontinuous motion of the moving image being visually recognized, and burn-in due to an imbalance in the ion density can be reduced.

That is, where the present frame is in the first frame group, the sub-frame shift ratio, i.e., the value of the first composite ratio α is adjusted, i.e., gradually decreased frame by frame. Incidentally, the adjustment of the sub-frame shift ratio is performed at a sub-frame shift ratio controller 106 of FIG. 1A, and the control of the timings of the sub-frame shift ratio changes is performed at a control timing determiner 108.

Figure 3:
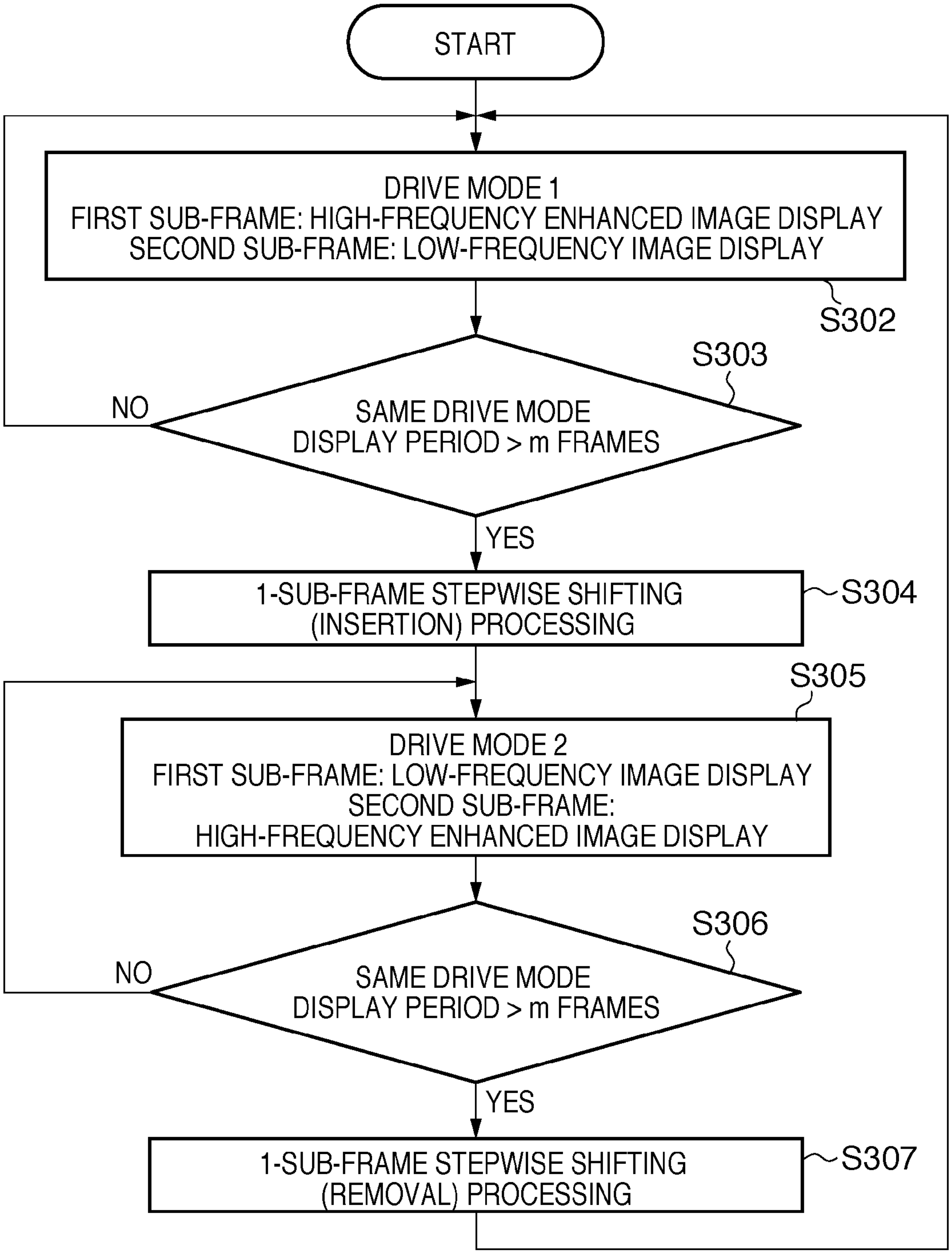
FIG. 3 is a flowchart of the video processing method according to the first embodiment.

The above series of processing steps will be explained below with reference to a flowchart of FIG. 3. To begin with, at step S302, a mode is established in which the high-frequency enhanced image H(n) and the low-frequency image L(n) are displayed at the first sub-frame and the second sub-frame, respectively (hereinafter referred to as "drive mode 1"). In the drive mode 1, the sub-frame shift ratio is fixed at a predetermined maximum value (for example, 1 (100%)). At step S303, the drive mode 1 is continued at m frame(s) (m is an integer of 1 or larger) previous to the first frame group. While the drive mode 1 is being continued, a pseudo-impulse driving method, wherein the high-frequency enhanced images and the low-frequency images are alternately displayed, is executed, and thus the effect of reducing the motion blur can be expected.

Next, at step S304, stepwise switching processing of the sub-frame images is performed at the sub-frame shift ratios expressed by the expression (1). At this step, the sub-frame shift ratio is decreased from 100% to 0% at a certain rate frame by frame. Although the case where the rate is set to 10% has been taken as an example in the diagram 2*d* in FIG. 2, there is no need to necessarily set the rate to 10%. As the rate is decreased, the shift quantity at each frame is decreased, and thus the discontinuity of the moving images is reduced. However, as the rate is decreased, the number of frames where the sub-frame shift ratio is changed stepwise is increased, and therefore there is a disadvantage that a period of time lengthens when the effect of reducing the motion blur due to the pseudo-impulse driving is diminished. On the other hand, as the rate is increased, such period of time shortens, but the discontinuity of the moving images due to the image display order shifting tends to be visually recognized. And further, if the sub-frame shift ratio is abruptly changed, the abrupt change will be noticeable, and thus the discontinuity will be visually recognized as image quality degradation. From an experiment, it has been confirmed that by changing the sub-frame shift ratio stepwise over 256 frames (the rate of each change is about 0.4%), the discontinuity of moving images is not visually recognized and image quality degradation, due to the change in the shift quantity, is also not noticeable.

By setting the sub-frame shift ratio to a predetermined minimum value (for example, 0%) (see the state 221 in the diagram 2*d* in FIG. 2), the low-frequency image L(n−1) and the high-frequency enhanced image H(n) are displayed at the first sub-frame and the second sub-frame, respectively. In this embodiment, after the display, a mode in which the sub-frame shift ratio is fixed at the minimum value (hereinafter referred to as "drive mode 2") is established, in step S305. Then, at step S306, the drive mode 2 is continued only at m frame(s) (m is an integer of 1 or larger) between the first frame group and the subsequent second frame group comprised of N consecutive frames. By switching from the drive mode 1 to the drive mode 2 like this, that is, by inverting the order of the high-frequency enhanced image display and the low-frequency image display, burn-in due to the imbalance in the ion density is prevented. Incidentally, as in the case of the drive mode 1, while the drive mode 2 is being continued, a pseudo-impulse driving method is established, and thus the effect of reducing the motion blur can be expected. And further, with the m time frame(s) at which the drive mode 1 or 2 is continued between the first and second groups, if the number m is small, the sub-frame image switching processing will be carried out in a short cycle, and the viewer will tend to notice that change. From an experiment, it has been confirmed that by setting the number m of the time frames to about 1800 (which corresponds to about 30 seconds), such a change tends not to be noticed.

Next, at step S307, the present frame is shifted to the second frame group, and then sub-frame images are subjected to stepwise switching processing using the sub-frame shift ratios expressed by the expression (1). In that case, the sub-frame shift ratio is gradually increased from 0% to 100% at a certain rate frame by frame. When the sub-frame shift ratio has reached 100%, the processing returns to step S302, resulting in the drive mode 1, and thus loop processing is carried out.

In the embodiment described above, display order switching between sub-frame images is performed stepwise at each sub-frame shift ratio. As a result, image quality degradation, such as burn in, can be prevented while reducing the motion blur by pseudo-impulse driving.

Second Embodiment

Figure 1B:
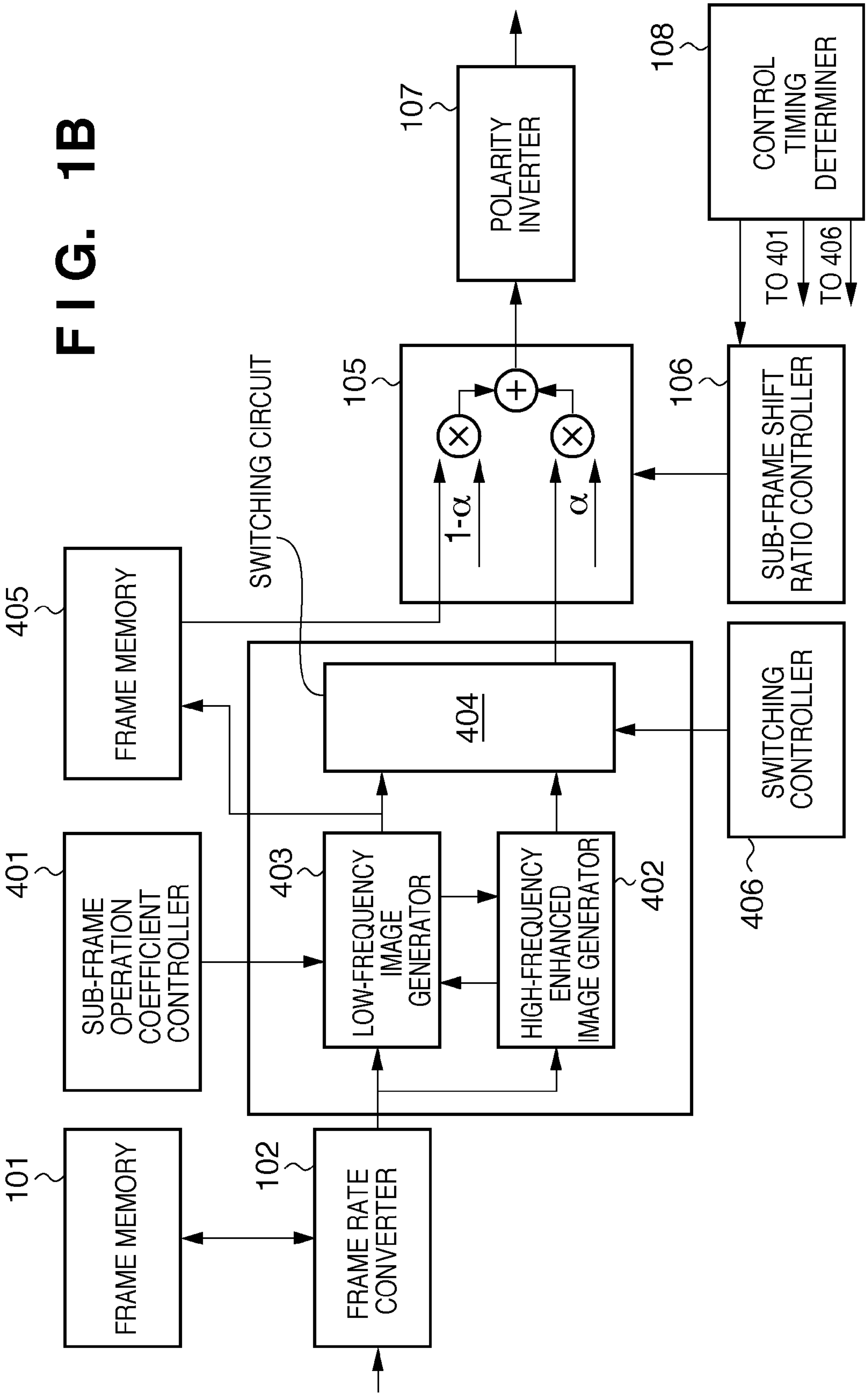
FIG. 1B is a block diagram of a video processing apparatus according to a second embodiment.

FIG. 1B is a block diagram of a video processing apparatus according to a second embodiment for operating a liquid crystal display device. To begin with, 60-Hz original image data read from the frame memory 101, for example, is subjected to double-speed processing at the frame rate converter 102, whereby 120-Hz sub-frame images are generated. Thereafter, a high-frequency enhanced image generator 402 generates high-frequency enhanced image data, and a low-frequency image generator 403 generates low-frequency image data, and then the image data is output from a switching circuit 404 selectively and alternately. The image data generated by the low-frequency image generator 403 and the high-frequency enhanced image generator 402 can be stored in a frame memory 405.

Figure 4:
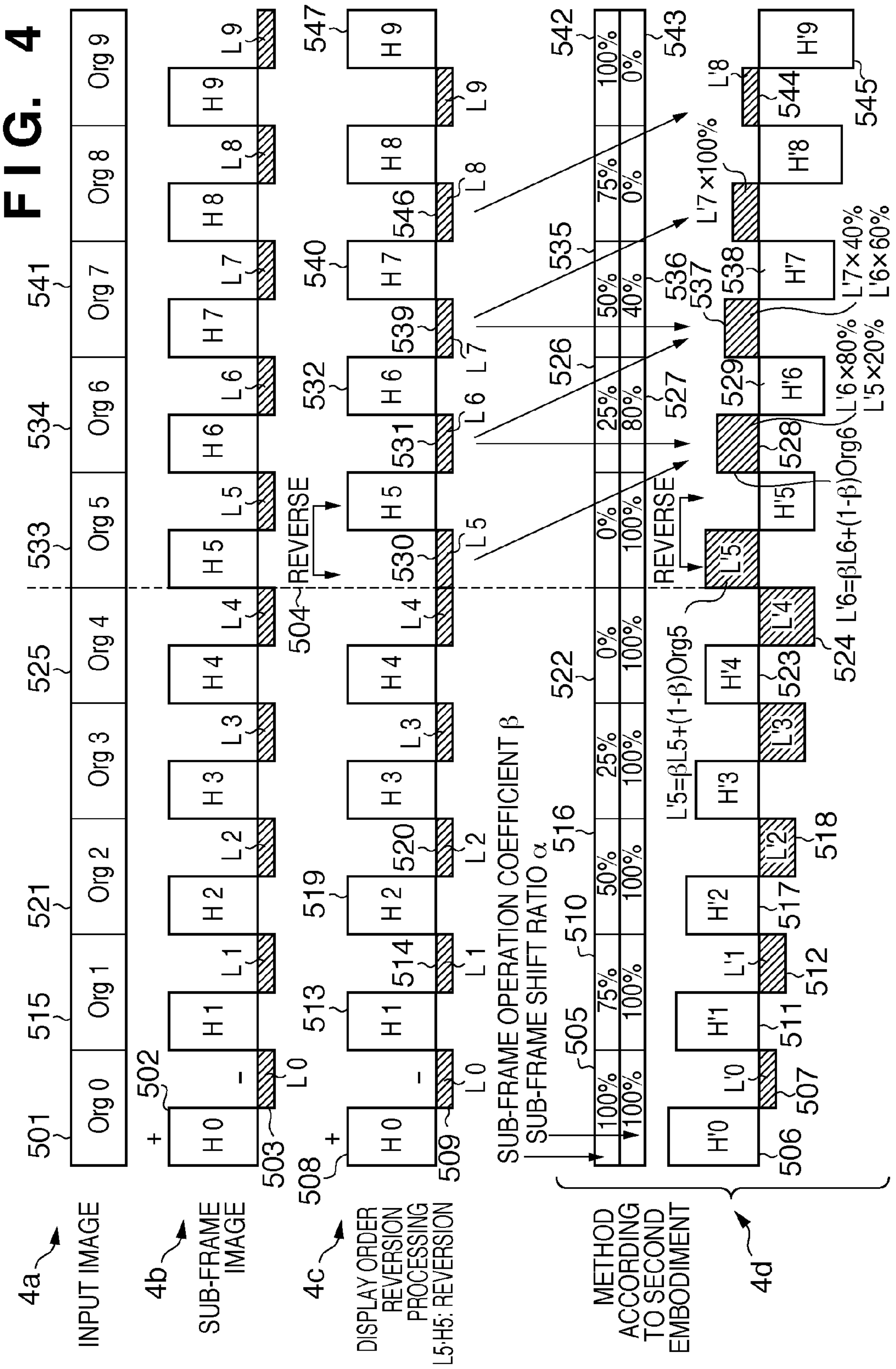
FIG. 4 is an illustration of a video processing method according to the second embodiment.

The above processing will be described in detail below with reference to FIG. 4. In FIG. 4, as in the case of FIG. 2, it is assumed that the first frame group, which is composed of N consecutive frames (N is an integer of 2 or larger), is formed. In the figure, the number N of the frames is set to 10 as an example. In diagram 4*a* of FIG. 4, reference numeral 501 denotes a 60-Hz input image Org(0) at the zeroth frame; the input image Org(0) 501 is subjected to double-speed processing. Reference numeral 502 denotes a 120-Hz high-frequency enhanced image H(0) at the zeroth frame, and reference numeral 503 denotes a 120-Hz low-frequency image L(0) at the zeroth frame. The 120-Hz high-frequency enhanced image H(0) 502 and the 120-Hz low-frequency image L(0) 503 are generated respectively at the high-frequency enhanced image generator 402 and the low-frequency image generator 403 of FIG. 1B after double-speed processing, following which both the images H(0) 502 and L(0) 503 are output from the switching circuit 404 selectively and alternately. In the diagram 4*b* in FIG. 4, as in the case of the diagram 2*b* in FIG. 2 referred to in the first embodiment, the polarization of applied voltage is brought about sub-frame by sub-frame, that is, pseudo-impulse driving is performed; therefore, when the images have been displayed as they are for hours, burn-in results.

The diagram 4*c* in FIG. 4 represents one solution to the above problem. Reference numeral 504 denotes image display switching timing; with such timing, that is, by issuing a command to invert the sub-frame image generation order from a switching controller 406 of FIG. 1B to the switching circuit 404, image display order switching is performed from the next frame. As a result, when applied voltages are of positive polarity, low-frequency images are displayed, and when applied voltages are of negative polarity, high-frequency enhanced images are displayed, whereby the imbalance in polarity between the applied voltages can be corrected.

However, there is a problem that at the above image display switching timing 504, the discontinuous motion of the moving images is visually recognized. This is due to the fact that when pseudo-impulse driving has been performed, the eyes follow high-frequency enhanced images. Therefore, when the time intervals between the high-frequency enhanced image displays are regular, the motion of the moving images can be normally confirmed with the eyes; however, when the time interval is not regular at some point in time, the eyes follow discontinuously, that is, the discontinuous motion of the moving images is visually recognized. And further, when the switching between the order of the high-frequency enhanced image generation and the order of the low-frequency image generation has been performed, the problem arises that the display status of the moving images changes before and after the switching. This problem is due to the fact that by the generation order switching, the image weighting at the frames changes. Assuming that a certain time frame n represents a high-frequency enhanced image H(n) and a low-frequency image L(n), image weighting at the frame is determined by the order in which the images H(n) and L(n) are displayed. When the display order has been from the image H(n) to the image L(n), viewing occurs such that image weighting is placed upon the first-displayed image H(n), and even when the display order has been changed from the image L(n) to the image H(n), viewing occurs such that image weighting is placed upon the last-displayed image H(n). This is because the eyes follow high-frequency enhanced images. In moving image display, the results of the inter-frame integration of high-frequency enhanced images and that of low-frequency images differ depending on which time frame such weighting is placed upon, and therefore a change in the display status of the moving images, such as the reversion of an afterimage direction, occurs.

In this embodiment, to circumvent the problems that at the time of generation order switching between sub-frame images, the motion of the moving images become discontinuous and that the display status of the moving images changes before and after the switching, a method will be described below. As shown in the diagram 4*b* in FIG. 4, the high-frequency enhanced images H(n) and the low-frequency images L(n) (n's are frame numbers) of the diagram 4*c* in FIG. 4 are changed stepwise by using a sub-frame operation coefficient so that they come close to each input image Org(n) (which is referred to as "first image combining processing"). This operation processing is carried out at the sub-frame operation coefficient controller 401, the high-frequency enhanced image generator 402, and the low-frequency image generator 403 of FIG. 1B. Such processing is expressed by the following expression (2).

$$\text{First-Sub-Frame Image}=H(n)*\beta(n)+\text{Org}(n)*(1-\beta(n))$$

$$\text{Second-Sub-Frame Image}=L(n)*\beta(n)+\text{Org}(n)*(1-\beta(n)) \quad \text{Expression (2)}$$

where $0\leqq\beta(n)\leqq1$ and n is a frame number.

The expression is explained as follows. To begin with, the high-frequency enhanced image generator 402 combines the high-frequency enhanced image data H(n) and the original image data Org(0) at the present frame at a first composite ratio β(n) ($0\leqq\beta(n)\leqq1$). Image data obtained by the combining is used as first-sub-frame image data. Likewise, the low-frequency image generator 403 combines the low-frequency image data L(n) and the original image data Org(n) at the present frame at the first composite ratio β(n). Image data obtained by the combining is used as second-sub-frame image data. Incidentally, the first composite ratio β(n), defined as a real number of 0 to 1 in the above example, is also hereinafter referred to as "sub-frame operation coefficient"; in that case, it is expressed in the unit percent (%).

The above processing will be specifically described below with reference to the diagram 4*d* in FIG. 4. To begin with, with the zeroth frame, reference numeral 505 denotes a state at which the sub-frame operation coefficient is set to 100%, reference numeral 506 denotes the first sub-frame after a mathematical operation using the expression (2), and reference numeral 507 denotes the second sub-frame after a mathematical operation using the expression (2). In the state where the sub-frame operation coefficient is set to 100%, the first sub-frame represents a high-frequency enhanced image H(0) 508, and the second sub-frame represents a low-frequency image L(0) 509, which is the same as in the case of ordinary pseudo-impulse driving.

Next, with the first frame, reference numeral 510 denotes a state at which the sub-frame operation coefficient is set to 75%, and reference numerals 511 and 512 respectively denote the first sub-frame and the second sub-frame after mathematical operations using the expression (2). In the state where the sub-frame operation coefficient is set to 75%, the first sub-frame 511 represents an image generated by adding a high-frequency enhanced image H(1) 513 and an input image Org(1) 515 together at a ratio of 3:1. Likewise, the second sub-frame 512 represents an image generated by adding a low-frequency image L(1) 514 and the input image Org(1) 515 together at a ratio of 3:1.

With the second frame, reference numeral 516 denotes a state at which the sub-frame operation coefficient is set to 50%. In this state, the first sub-frame 517 represents an image generated by adding a high-frequency enhanced image H(2) 519 and an input image Org(2) 521 together at a ratio of 1:1, and the second sub-frame 518 represents an image generated by adding a low-frequency image L(2) 520 and the input image Org(2) 521 together at a ratio of 1:1.

Finally, as shown in a state 522 where the sub-frame operation coefficient is set to 0%, an image Org(4) 525 is displayed at the first and second sub-frames 523 and 524. That is, while the present frame is in the first half of the first frame group, the sub-frame operation coefficient, i.e., the value of the first composite ratio β is adjusted, i.e., gradually decreased, frame by frame. As a result, the high-frequency enhanced images and the low-frequency images replace the input images stepwise.

Then, with the display image switching timing 504 set at the boundary between the first half and the second half of the first frame group, generation order switching between subsequent first-sub-frame images and second-sub-frame images is performed. Since each sub-frame image is switched to each original image at the same time frame, there is no occurrence of the discontinuous motion of the images due to the eyes following the high-frequency enhanced images. Note that although the generation order switching is performed after the sub-frame operation coefficient of 0% has been used, i.e., each sub-frame image has been switched to each input image in this embodiment, there is no need to necessarily set the sub-frame operation coefficient to 0%. The coefficient may be set to a small value sufficient to lessen the intensity of the high-frequency enhanced images to the extent that visual following does not occur.

After the display image switching, first-sub-frame images and second-sub-frame images are respectively changed to low-frequency images and high-frequency enhanced images by using sub-frame operation coefficients step by step. At the same time, the present low-frequency image is changed to the low-frequency image at the immediately preceding frame at a sub-frame shift ratio (second composite ratio) $\alpha$. Incidentally, the stepwise changes using the sub-frame operation coefficients are carried out at the sub-frame operation coefficient controller 401, the high-frequency enhanced image generator 402, and the low-frequency image generator 403 of FIG. 1B. At the time of the switching to the low-frequency image at the immediately preceding frame, the present low-frequency image and a low-frequency intermediate image delayed by one sub-frame at the frame memory 405 of FIG. 1B are merged at a ratio at a sub-frame shift operation unit 105 (which is referred to as "second image combining processing") as described in detail below. Such processing is expressed by the expression (3).

$$\text{First-Sub-Frame Image}=L(n)*\beta(n)+Org(n)*(1\beta(n))*\alpha+(L(n-1)*\beta(n-1)+Org(n-1)*(1-\beta(n-1))*(1-\alpha)$$

$$\text{Second-Sub-Frame Image}=H(n)*\beta(n)+Org(n)*(1-\beta(n)) \qquad \text{Expression (3)}$$

where $\alpha$ is a sub-frame shift ratio ($0\leqq\alpha\leqq1$), $\beta$ is a sub-frame operation coefficient ($0\leqq\beta\leqq1$), and n is a frame number.

The expression is explained as follows. To begin with, the low-frequency image generator 403 combines low-frequency image data L(n) and original image data Org(n) at the present frame at a first composite ratio (by using a sub-frame operation coefficient) $\beta(n)$. The above ratio is expressed by the partial expression $L(n)*\beta(n)+Org(n)*(1-\beta(n))$ of the expression (3). Image data obtained by this combination is stored in the frame memory 405 as first intermediate image data. Next, first intermediate image data at the immediately preceding frame is read from the frame memory 405 as second intermediate image data. The second intermediate image data is expressed by the partial expression $L(n-1)*\beta(n-1)+Org(n-1)*(1-\beta(n-1))$ of the expression (3). Thereafter, the first intermediate image data at the present frame and the second intermediate image data read therefrom are combined at a second composite ratio (sub-frame shift ratio) a to generate image data at the first sub-frame. Furthermore, high-frequency enhanced image data H(n) output from the high-frequency enhanced image generator 402 and original image data Org(n) at the present frame are combined at the first composite ratio $\beta(n)$ to generate image data at the second sub-frame.

The above processing will be described in detail below with reference to the diagram 4*d* in FIG. 4. To begin with, with the sixth frame of the second half of the first frame group, reference numeral 526 denotes a state at which the sub-frame operation coefficient is set to 25%, and reference numeral 527 denotes a state at which the sub-frame shift ratio is set to 80%. And further, reference numeral 528 denotes the first sub-frame after a mathematical operation using the expression (3), and reference numeral 529 denotes the second sub-frame after a mathematical operation using the expression (3).

The first-sub-frame image 528 is generated as follows. To begin with, the high-frequency enhanced image L(6) 531 and the input image Org(6) 534 are added together at the ratio of 3:1 by using the sub-frame operation coefficient of 25%, and the low-frequency image L(5) 530 and the input image Org(5) 533 are added at the ratio of 3:1 by using the sub-frame operation coefficient of 25%. Then images generated by the above mathematical operations are added together at the sub-frame shift ratio of 80%, i.e., at the ratio of 4:1 to generate the first-sub-frame image. Likewise, the second-sub-frame image is generated by adding the high-frequency enhanced image H(6) 532 and the input image Org(6) 534 together by using the sub-frame operation coefficient of 25%, i.e., at the ratio of 3:1.

Next, with the seventh frame, reference numeral 535 denotes a state at which the sub-frame operation coefficient is set to 50%, and reference numeral 536 denotes a state at which the sub-frame shift ratio is set to 40%. The first-sub-frame image 537 is generated as follows. To begin with, the low-frequency image L(7) 539 and the input image Org(7) 541 are added together by using the sub-frame operation coefficient of 50%, i.e., at the ratio of 1:1, and the low-frequency image L(6) 531 and the input image Org(6) 534 are added together by using the sub-frame operation coefficient of 50%, i.e., at the ratio of 1:1. Then images generated by the above mathematical operations are added together at the sub-frame shift ratio of 40%, i.e., at the ratio of 2:3 to generate the first-sub-frame image. Likewise, a second-sub-frame image 538 is generated by adding the high-frequency image H(7) 540 and the input image Org(7) 541 together by using the sub-frame operation coefficient of 50%, i.e., at the ratio of 3:1. Finally, in a state 542 where the sub-frame operation coefficient is set to 100% and a state 543 where the sub-frame shift ratio of 0%, the first sub-frame 544 represents the low-frequency image L(8) 546 at the immediately preceding frame, and the second sub-frame 545 represents the high-frequency enhanced image H(9) 547.

In this way, the first-sub-frame images are switched to the low-frequency images at the immediately preceding frames through being changed to the low-frequency images by increasing the sub-frame operation coefficients. The second-sub-frame images are changed to the high-frequency enhanced images by increasing the sub-frame operation coefficients. By switching the low-frequency images to the low-frequency images at the immediately preceding frames after the generation order switching between the sub-frame images like this, the display order of the high-frequency enhanced images and the low-frequency images can be kept before and after the switching. As a result, it becomes possible to eliminate a change in the display status of moving images, such as the reversion of an afterimage direction.

Figure 5:
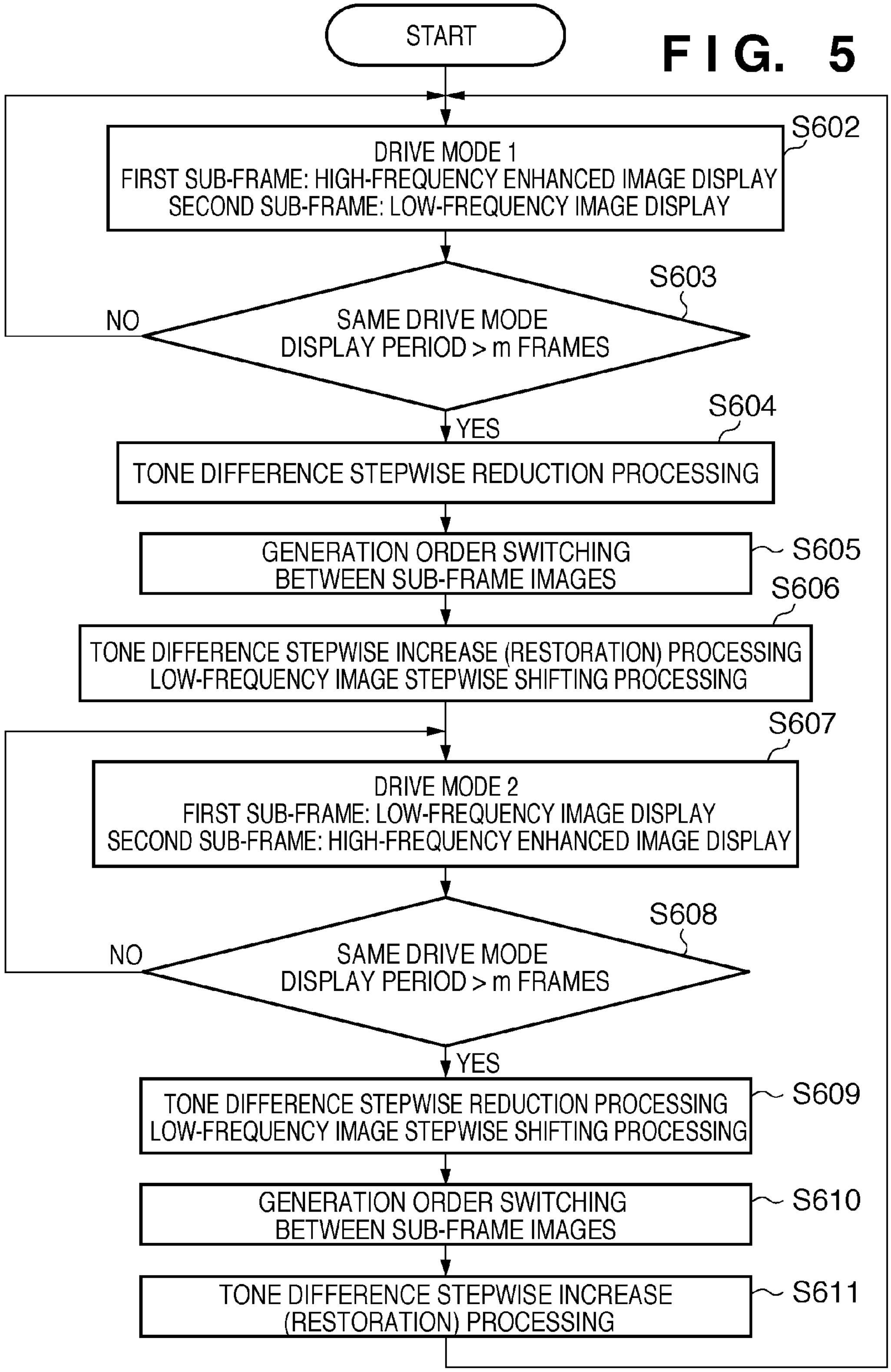
FIG. 5 is a flowchart of the video processing method according to the second embodiment.

The series of processing steps described above will be further explained below with reference to a flowchart of FIG. 5. To begin with, at step S602, a mode is established in which high-frequency enhanced images H(n) are displayed at first sub-frames, and low-frequency images L(n) are displayed at second sub-frames (which is hereinafter referred to as "drive mode 1"). In the drive mode 1, the value of the sub-frame operation coefficient $\beta$ is fixed at a predetermined maximum value (for example, 100%). Next, at step S603, the drive mode 1 is continued only at a certain number m of frames previous to the first frame group. While the drive mode 1 is being continued, pseudo-impulse driving, in which the high-frequency enhanced images and the low-frequency images are alternately displayed, is performed, and thus the effect of reducing the motion blur can be expected.

Then, at step S604, as expressed by the expression (2), the high-frequency images at the first sub-frames and the low-frequency images at the second sub-frames are made stepwise to come close to the original images by using the sub-frame operation coefficients β. In that case, the sub-frame operation coefficient β is decreased from 100% to 0% at a certain rate frame by frame. After the sub-frame operation coefficient β of 0% has been used, generation order switching between the sub-frame images is performed at the sixth frame, i.e., at the beginning of the second half of the first frame group at step S605. This switching is implemented by a mathematical operation using the foregoing expression (3) with the sub-frame operation coefficient β and the sub-frame shift ratio α set to 0% and 100% respectively as in the case of the fifth frame.

At step S606, as expressed by the foregoing expression (3), the input images at the first sub-frames and the input images at the second sub-frames are switched respectively to low-frequency images and high-frequency enhanced images stepwise by using the sub-frame operation coefficients β. At the same time, low-frequency images at the first-sub-frames are switched to the low-frequency images at the immediately preceding frame, frame by frame at the sub-frame shift ratios α. In this case, the sub-frame operation coefficient β is increased from 0% to 100% at a certain rate, frame by frame, and the sub-frame shift ratio α is decreased from 100% to 0% at a certain rate, frame by frame.

At step S607, by setting the sub-frame operation coefficient β and the sub-frame shift ratio α to 100% and 0% respectively (see the steps S42 and S43 in the diagram 4*d* in FIG. 4), a low-frequency image L(n−1) and a high-frequency enhanced image H(n) are displayed at the first sub-frame and the second sub-frame, respectively. In this embodiment, after the displays, a mode is established in which the sub-frame operation coefficient β is fixed at 100%, and the sub-frame shift ratio α is fixed at 0% (which is hereinafter referred to as "drive mode 2"). At step S608, the drive mode 2 is continued only at a certain number m of frames between the first frame group and the second frame group composed of subsequent N frames. By switching from the drive mode 1 to the drive mode 2 like this, that is, by inverting the display order of the high-frequency enhanced images and that of the low-frequency images, burn-in due to the imbalance in the ion density is circumvented. Incidentally, while the drive mode 2 is being continued, pseudo-impulse driving is performed as in the case of the drive mode 1, and thus, the effect of reducing the motion blur can be expected. And further, with the number m of the frames (the period m) where the drive mode 1 or 2 is continued between the first and second frame groups, when the number m is small, sub-frame image switching processing is performed at a short cycle, and therefore the viewer tends to notice such a change. From an experiment, it has been confirmed that by setting the number m (the period m) to about 1800 (about 30 seconds), such a change is hard to notice.

At step S609, the present frame shifts to the second frame group, where low-frequency images at the first sub-frames and high-frequency enhanced images at the second sub-frames are switched to the input images stepwise by using the sub-frame operation coefficients β as expressed by the expression (3). At the same time, the low-frequency images at the first sub-frames are switched stepwise to the low-frequency images at the original frames at the sub-frame shift ratios α. Here, the sub-frame operation coefficient β is gradually decreased from 100% to 0% at a certain rate frame by frame, and the sub-frame shift ratio α is gradually increased from 0% to 100% at a certain rate frame by frame. After having changed the sub-frame operation coefficient β to 0%, generation order switching between the sub-frame images is performed at step S610.

At step S611, as expressed by the expression (2), the input images at the sub-frames are switched stepwise to high-frequency enhanced images at the first sub-frames and low-frequency images at the second sub-frames by using the sub-frame operation coefficients β. Here, the sub-frame operation coefficient β is gradually increased from 0% to 100% at a certain ratio frame by frame. When the sub-frame operation coefficient β has reached 100%, the processing returns to step S602, resulting in the drive mode 1, and thus loop processing is carried out.

Although the sub-frame operation coefficient β and the sub-frame shift ratio α are each changed at such a predetermined rate in the diagram 4*d* in FIG. 4 referred to in the above example, there is no need to necessarily set them to the values shown in the figure. With the sub-frame operation coefficient, when the rate of each change is low, the number of the frames where the coefficient is changed increases, and this brings the demerit that the period when the effect of reducing the motion blur due to the pseudo-impulse driving lessens lengthens. In contrast, when the rate of each change is high, the period when the effect of reducing the motion blur lessens shortens, but an abrupt change in sub-frame operation results is noticeable, and thus visually recognized as image quality degradation. From an experiment, it has been confirmed that by changing the sub-frame operation coefficient (from 100% to 0% or from 0% to 100%) over 128 frames (the rate of each change is about 0.8%), image quality degradation due to the changes in the coefficient is not noticeable.

With the sub-frame shift ratio, when the rate of each change is low, it takes time to return the order of high-frequency enhanced images and low-frequency images, but when the rate of each change is high, an abrupt change in sub-frame operation results is noticeable, and thus visually recognized as image quality degradation. From an experiment, it has been confirmed that by changing the sub-frame shift ratio (from 100% to 0% or from 0% to 100%) over 64 frames (the rate of each change is about 1.6%), image quality degradation due to the changes in the ratio is not noticeable.

As described above, in this embodiment, generation order switching between sub-frame images is performed while lessening the intensity of high-frequency enhanced images, and image weighting is adjusted by performing switching between low-frequency images. As a result, image quality degradation, such as burn-in, can be prevented while reducing the motion blur by pseudo-impulse driving.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While the present invention has been described with reference to exemplary embodiment, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-003412, filed Jan. 8, 2010, which is hereby incorporated by reference herein in its entirety.

What is claimed is:

1. A video processing apparatus for inputting a video signal input on a frame-by-frame basis, generating two sub-frame images for each frame, and outputting the generated images, the apparatus comprising:

an input unit configured to input a video signal on a frame-by-frame basis;

a sub-frame generating unit configured to generate high-frequency image data and low-frequency image data from original image data input at each frame and to alternately output the generated high-frequency image data and the generated low-frequency image data at a frequency that is double the frame rate at which the input unit has input the video signal;

an image combining unit configured to generate image data as first-sub-frame image data by combining the high-frequency image data and the low-frequency image data at the immediately preceding sub-frame output from the sub-frame image generating unit at a first composite ratio $\alpha$ ($0 \leqq \alpha \leqq 1$), and to generate image data as second-sub-frame image data by combining the low-frequency and high-frequency image data output from the sub-frame image generating unit at a second composite ratio $1-\alpha$; and a polarity inverting unit configured to invert the polarity of the second-sub-frame image data with respect to the first-sub-frame image data generated by the image combining unit to produce polarity-inverted image data and then to output the polarity-inverted image data, wherein the image combining unit includes an adjusting unit configured to adjust the first composite ratio $\alpha$ so that the first composite ratio $\alpha$ decreases frame by frame while the present frame is in a first frame group composed of N consecutive frames (N being an integer of 2 or larger), and to adjust the first composite ratio $\alpha$ so that the first composite ratio $\alpha$ increases frame by frame while the present frame is in a second frame group composed of M consecutive frames (M being an integer of 2 or larger) subsequent to the first frame group.

2. The video processing apparatus according to claim 1, wherein the image combining unit further fixes the first composite ratio $\alpha$ at a predetermined maximum value while the present frame is in the range of l frame(s) (l being an integer of 1 or larger) previous to the first frame group, and fixes the first composite ratio $\alpha$ at a predetermined minimum value while the present frame is in the range of l frame(s) between the first frame group and the second frame group.

3. A video processing apparatus for inputting a video signal on a frame-by-frame basis, generating two sub-frame images at each frame, and outputting the generated images, the apparatus comprising:

an input unit configured to input a video signal on a frame-by-frame basis;

a sub-frame image generating unit configured to generate high-frequency image data and low-frequency image data from original image data input at each frame and to alternately output the generated high-frequency image data and the generated low-frequency image data at a frequency that is double the frame rate at which the input unit has input the video signal;

a storage unit configured to store the image data generated by the sub-frame image generating unit;

a first image combining unit configured to, when the present frame is in the first half of a first frame group composed of N consecutive frames (N being an integer of 2 or larger) or in the second half of a second frame group composed of N consecutive frames subsequent to the first group, generate image data as first-sub-frame image data by combining the high-frequency image data output from the sub-frame image generating unit and the original image data at the present frame at a first composite ratio $\beta$ ($0 \leqq \beta \leqq 1$), and generate image data as second-sub-frame image data by combining the low-frequency image data output from the sub-frame image generating unit and the original image data at the present frame at the first composite ratio $\beta$;

a second image combining unit configured to, when the present frame is in the second half of the first frame group or the first half of the second frame group, store in the storage unit first intermediate image data obtained by combining the low-frequency image data output from the sub-frame image generating unit and the original image data at the present frame at the composite ratios $\beta$, generate image data as first-sub-frame image data by combining the first intermediate image data at the present data and second intermediate image data that is first intermediate image data at the immediately preceding frame read from the storage unit at a second composite ratio $\alpha$ ($0 \leqq \alpha \leqq 1$), and generate image data as second-sub-frame image data by combining the high-frequency image data output from the sub-frame image generating unit and the original image data at the present frame at the first composite ratio $\beta$; and a polarity inverting unit configured to invert the polarity of the second-sub-frame image data with respect to the first-sub-frame image data generated by the first and the second image combining units to produce polarity-inverted image data, and then output the polarity-inverted image data, wherein the first image combining unit adjusts the first composite ratio $\beta$:

so that the first composite ratio $\beta$ decreases frame by frame while the present frame is in the first half of the first frame group, and so that the first composite ratio $\beta$ increases frame by frame while the present frame is in the second half of the second frame group, and the second image combining unit adjusts the first composite ratio $\beta$ and the second composite ratio $\alpha$:

so that the first composite ratio $\beta$ increases frame by frame, and the second composite ratio $\alpha$ decreases frame by frame, while the present frame is in the second half of the first frame group, and so that the first composite ratio $\beta$ decreases frame by frame, and the second composite ratio $\alpha$ increases frame by frame, while the present frame is in the first half of the second frame group.

4. The video processing apparatus according to claim 3, wherein the first image combining unit further fixes the first composite ratio $\beta$ at a predetermined maximum value, while the present frame is in the range of m frame(s) (m being an integer of 1 or larger) previous to the first frame group, and the second image combining unit further fixes the first composite ratio β at a predetermined maximum value, and fixes the second composite ratio α at a predetermined minimum value, while the present frame is in the range of m frame(s) between the first frame group and the second frame group.

5. A method for processing video executed by a video processing apparatus which inputs a video signal on a frame by frame basis, generates two sub-frame images at each frame, and then outputs the images, the method comprising:

an input step of inputting a video signal on a frame-by-frame basis via an input unit;

a sub-frame image generation step of generating high-frequency image data and low-frequency image data from original image data input at the frames, and outputting alternately the generated high-frequency image data and the generated low-frequency image data at a frequency that is double the frame rate at which the input unit has input the video signal;

an image combination step of generating image data as first-sub-frame image data by combining the output high-frequency image data and the low-frequency image data at the immediately preceding sub-frame at a first composite ratio α (0≦α≦1), and generating image data as second-sub-frame image data by combining the output low-frequency image data and high-frequency image data at a second composite ratio 1−α; and a polarity inversion step of inverting the polarity of the second-sub-frame image data with respect to the first-sub-frame image data to produce polarity-inverted image data, and then outputting the polarity-inverted image data, wherein the image combination step includes:

adjusting the first composite ratio α so that the first composite ratio α decreases frame by frame, while the present frame is in a first frame group composed of N consecutive frames (N being an integer of 2 or larger); and adjusting the first composite ratio α so that the first composite ratio α increases frame by frame, while the present frame is in a second frame group composed of M consecutive frames (M being an integer of 2 or larger) subsequent to the first frame group.

6. A method for processing video executed by an image processing apparatus which inputs a video signal on a frame-by-frame basis, generates two sub-frame images at each frame, and then outputs the images, the method comprising:

an input step of inputting a video signal on a frame-by-frame basis via an input unit;

a sub-frame image generation step of generating high-frequency image data and low-frequency image data from original image data input at the frames, and outputting alternately the generated high-frequency image data and the generated low-frequency image data at a frequency that is double the frame rate at which the input unit has input the video signal;

a storage step of storing the output low-frequency image data in a storage unit;

a first image combination step of, when the present frame is in the first half of a first frame group composed of N consecutive frames (N being an integer of 2 or larger) or in the second half of a second frame group composed of N consecutive frames subsequent to the first frame group, generating image data as first-sub-frame image data by combining the output high-frequency image data and the original image data at the present frame at a first composite ratio β (0≦β≦1), and generating image data as second-sub-frame image data by combining the output low-frequency image data and the original image data at the present frame at the first composite ratio β;

a second image combination step of, when the present frame is in the second half of the first frame group or in the first half of the second frame group, storing image data, obtained by combining the output low-frequency image data and the original image data at the present frame at a first composite ratio β, in the storage unit as first intermediate image data, generating image data as first-sub-frame image data by combining the first intermediate image data at the present frame and second intermediate image data that is first intermediate image data at the immediately preceding frame read from the storage unit at a second composite ratio α (0≦α≦1), and generating image data as second-sub-frame image data by combining the output high-frequency image data and the original image data at the present frame at the first composite ratio β; and a polarity inversion step of inverting the polarity of the second sub-frame image data with respect to the first-sub-frame image data to produce polarity-inverted image data, and then outputting the polarity-inverted image data, wherein the first image combination step includes:

adjusting the first composite ratio β so that the first composite ratio β decreases frame by frame, while the present frame is in the first half of the first frame group; and adjusting the first composite ratio β so that the first composite ratio β increases frame by frame, while the present frame is in the second half of the second frame group, and the second image combination step includes:

adjusting the first and second composite ratios β and α so that the first composite ratio β increases frame by frame and decreases the second composite ratio α frame by frame, while the present frame is in the second half of the first frame group; and adjusting the first and second composite ratios β and α so that the first composite ratio β decreases frame by frame and the second composite ratio α increases frame by frame, while the present frame is in the first half of the second frame group.

* * * * *